:(12) United States Patent
Lanier et al.

(10) Patent No.: US 6,925,235 B2
(45) Date of Patent: Aug. 2, 2005

(54) FIBER OPTIC CABLE HAVING A LOW-SHRINK CABLE JACKET AND METHODS OF MANUFACTURING THE SAME

(75) Inventors: Jennifer K. Lanier, Granite Falls, NC (US); Donald K. Hall, Mooresville, NC (US); Naren I. Patel, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/958,143

(22) Filed: Oct. 4, 2004

(65) Prior Publication Data

US 2005/0041941 A1 Feb. 24, 2005

Related U.S. Application Data

(62) Division of application No. 10/038,073, filed on Jan. 4, 2002, now Pat. No. 6,801,695.

(51) Int. Cl.[7] .................................................. G02B 6/44
(52) U.S. Cl. ..................................................... 385/100
(58) Field of Search ................................ 385/100–114

(56) References Cited

U.S. PATENT DOCUMENTS

| | | | |
|---|---|---|---|
| 4,078,853 A | 3/1978 | Kempf et al. ............ | 350/96.23 |
| 4,515,435 A | 5/1985 | Anderson ................... | 385/103 |
| 4,552,432 A | 11/1985 | Anderson et al. .......... | 385/102 |
| 4,687,294 A | 8/1987 | Angeles ................... | 350/96.23 |
| 4,702,554 A | 10/1987 | Takahashi et al. ......... | 350/96.3 |
| 4,730,894 A | 3/1988 | Arroyo .................... | 350/96.23 |
| 4,762,392 A | 8/1988 | Yamamoto et al. ........ | 350/96.3 |
| 4,765,712 A | 8/1988 | Bohannon, Jr. et al. . | 350/96.23 |
| 4,826,278 A | 5/1989 | Gartside, III et al. .... | 350/96.23 |
| 4,844,575 A | 7/1989 | Kinard et al. ............ | 350/96.23 |
| 4,844,578 A | 7/1989 | Pierini et al. ............ | 350/96.34 |
| 4,881,795 A | 11/1989 | Cooper .................... | 350/96.23 |
| 5,082,348 A | 1/1992 | Gartside, III et al. ...... | 385/111 |
| 5,109,457 A | 4/1992 | Panuska et al. ............ | 385/102 |
| 5,125,063 A | 6/1992 | Panuska et al. ............ | 385/113 |
| 5,201,020 A | 4/1993 | Kannabiran ................ | 385/113 |
| 5,237,635 A | 8/1993 | Lai ........................... | 385/101 |
| 5,408,561 A | 4/1995 | McCallum, III et al. .... | 385/109 |
| 5,574,816 A | 11/1996 | Yang et al. ................ | 385/109 |
| 5,748,823 A | 5/1998 | Nave ........................ | 385/113 |
| 5,838,864 A | 11/1998 | Patel et al. ............... | 385/113 |
| RE36,157 E | 3/1999 | Robbins et al. ............ | 156/85 |
| 5,911,023 A | 6/1999 | Risch et al. ............... | 385/100 |

(Continued)

FOREIGN PATENT DOCUMENTS

GB        2036361 A    10/1979    ............ G02B/5/14

OTHER PUBLICATIONS

"Art", Admitted date of Apr. 2001.
Colin G. Richardson "The Development Of A New Low Shrink Jacketing Material For Optical Fiber Cables", 1986, pp 40–42.
http://basf.cordata.be/en/tpu.asp, "BASF Polyurethane", 2001.

(Continued)

Primary Examiner—David V. Bruce
Assistant Examiner—Thomas R Artman
(74) Attorney, Agent, or Firm—Michael E. Carroll, Jr.

(57) ABSTRACT

A fiber optic cable and methods for manufacturing the same the fiber optic cable including a fiber optic cable core, the fiber optic cable core includes at least one optical fiber and a separation layer. The separation layer generally surrounds the at least one optical fiber, and a cable jacket generally surrounds the separation layer. The cable jacket has an average shrinkage of about 2.0% or less during a cable jacket shrinkage test conducted at a temperature of 110° C. for 2 hours with the cable core removed. The low-shrink characteristic of the cable jacket preserves optical performance during, for example, temperature variations.

22 Claims, 7 Drawing Sheets

U.S. PATENT DOCUMENTS

| | | | |
|---|---|---|---|
| 6,324,324 B1 | 11/2001 | Dixon et al. | 385/100 |
| 6,334,015 B2 | 12/2001 | Jamet | 385/102 |
| 6,654,527 B2 * | 11/2003 | Sakabe et al. | 385/114 |
| 6,690,867 B2 | 2/2004 | Melton et al. | 385/114 |
| 2003/0174989 A1 | 9/2003 | Lanier et al. | |
| 2003/0185529 A1 | 10/2003 | Register, III et al. | |

OTHER PUBLICATIONS

"Single–Fiber Non–Plenum Cables"; admitted art.

"Table 2. Alcryn Injection Molding Grades"; Alcryn 2080 NC; admitted art.

BASF, "Wire & Cable Product Properties"; Elastollon ® 1185A10F; admitted art.

BF Goodrich, "Product Data For Estane ®58211 TPU Polyether Based Polyurethane", Mar. 1999.

BF Goodrich, "Product Data For Estane ®58202 TPU Polyether Based Poyurethane", Mar. 1999.

Teknor Apex Plastics, "Flame Retardant Uniprene 7100–80FR"; admitted art.

Gary Corp., "High Grade Jacketing Compound" GW 2240 VWI S; admitted art.

North American Plastics, Inc., "Noraplas 16881", Feb. 17, 1999.

Alphagary Corporation, "GFO 9940DW Natural", Dec. 23, 1997.

* cited by examiner

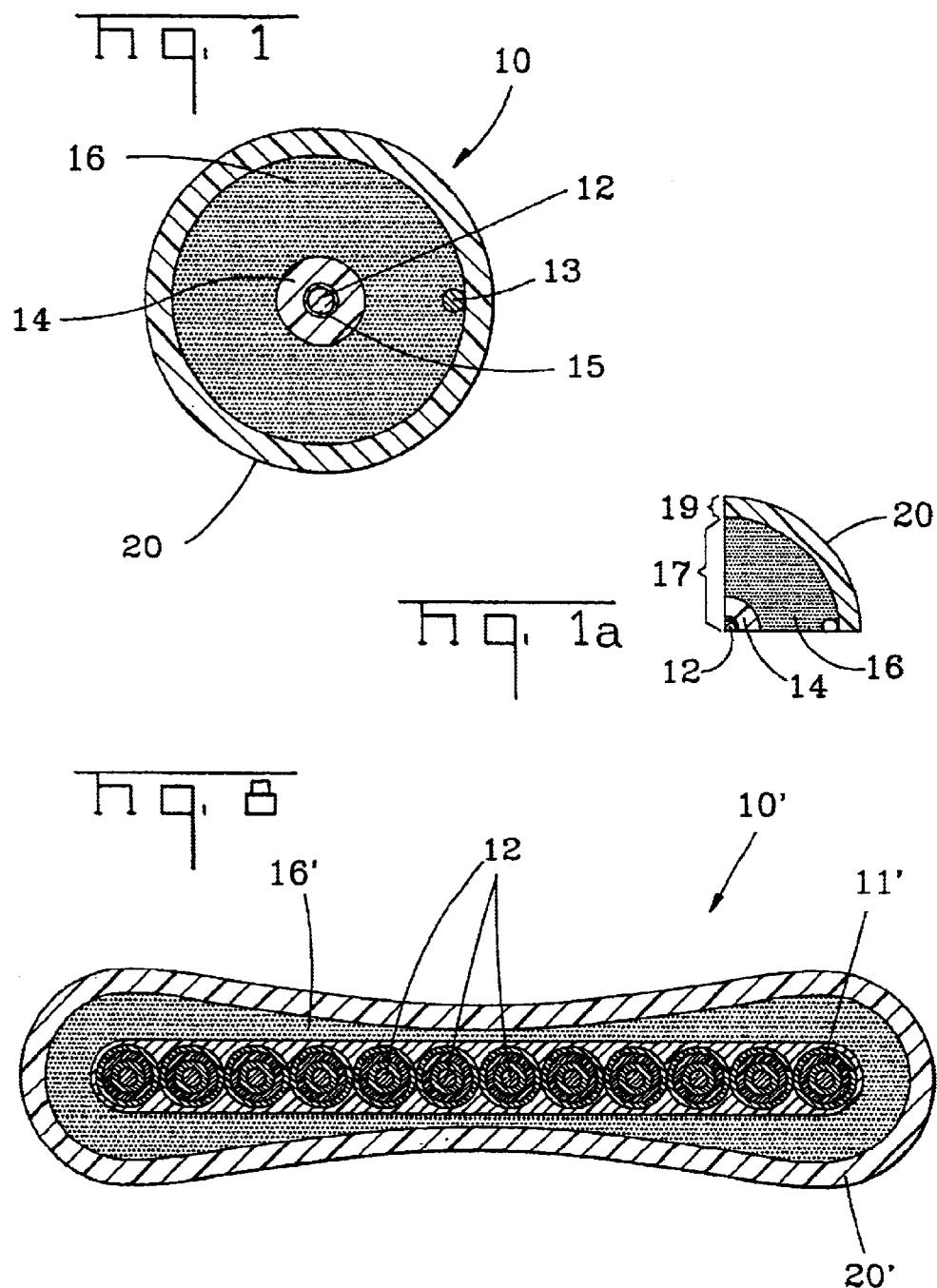

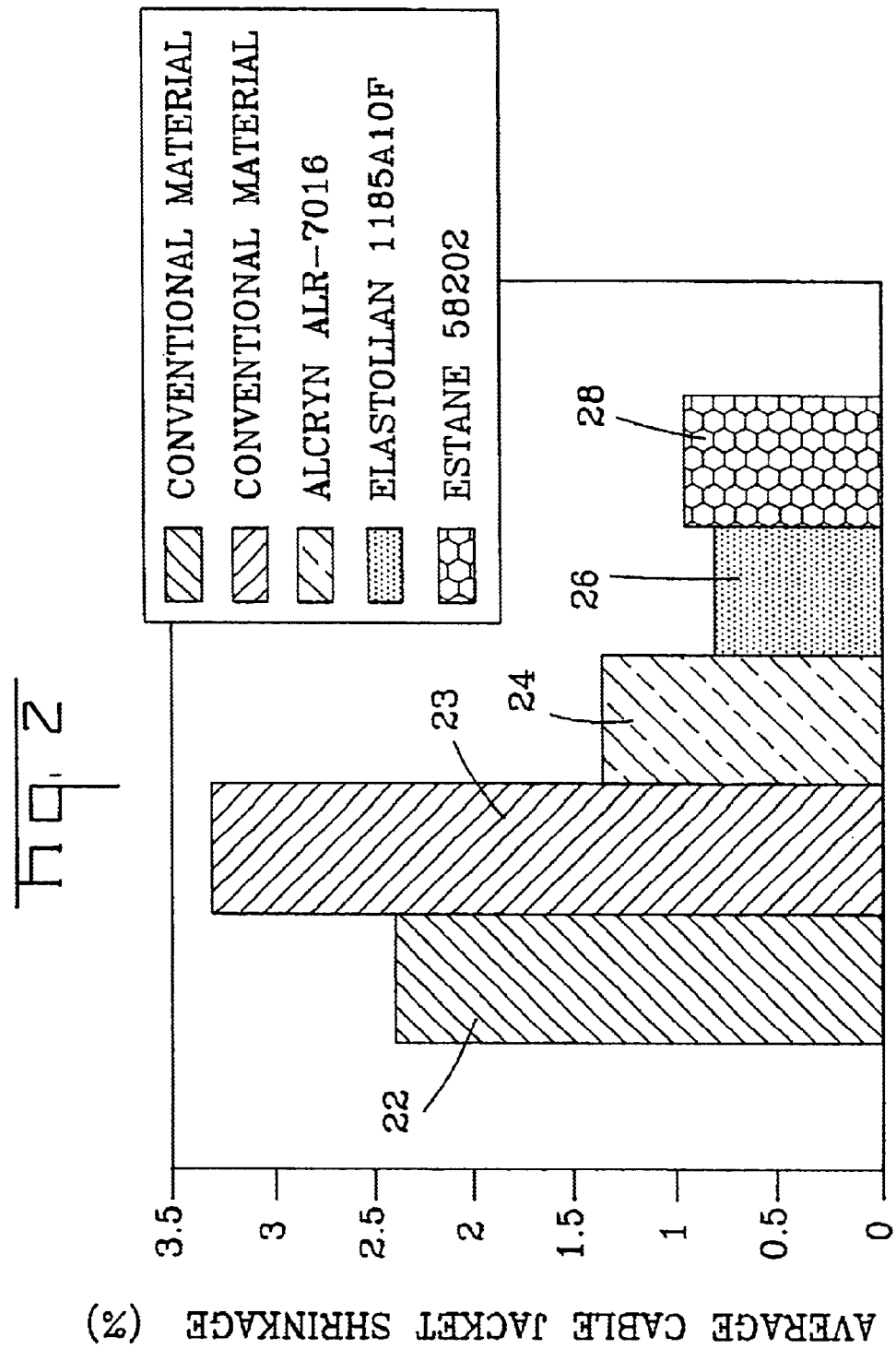

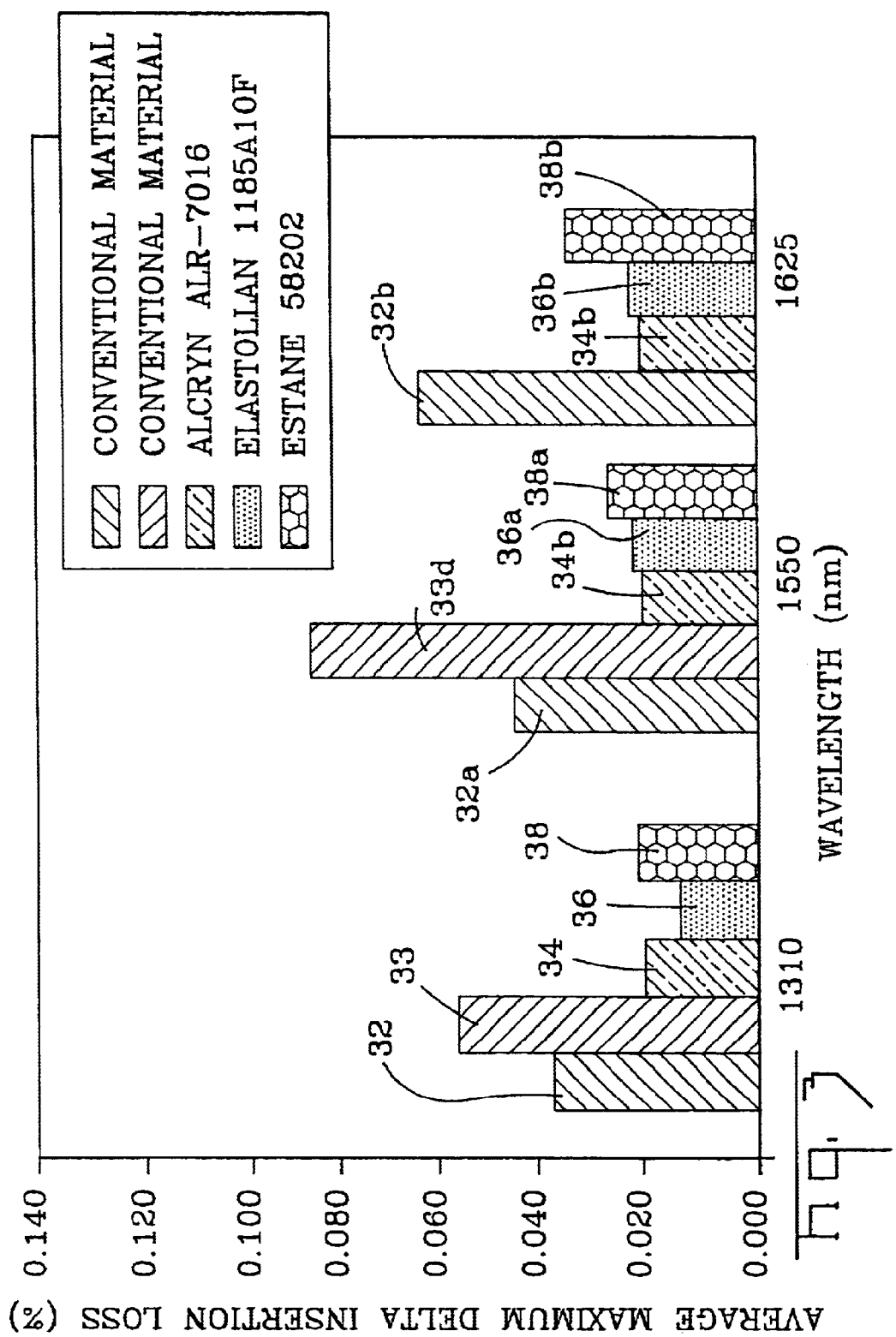

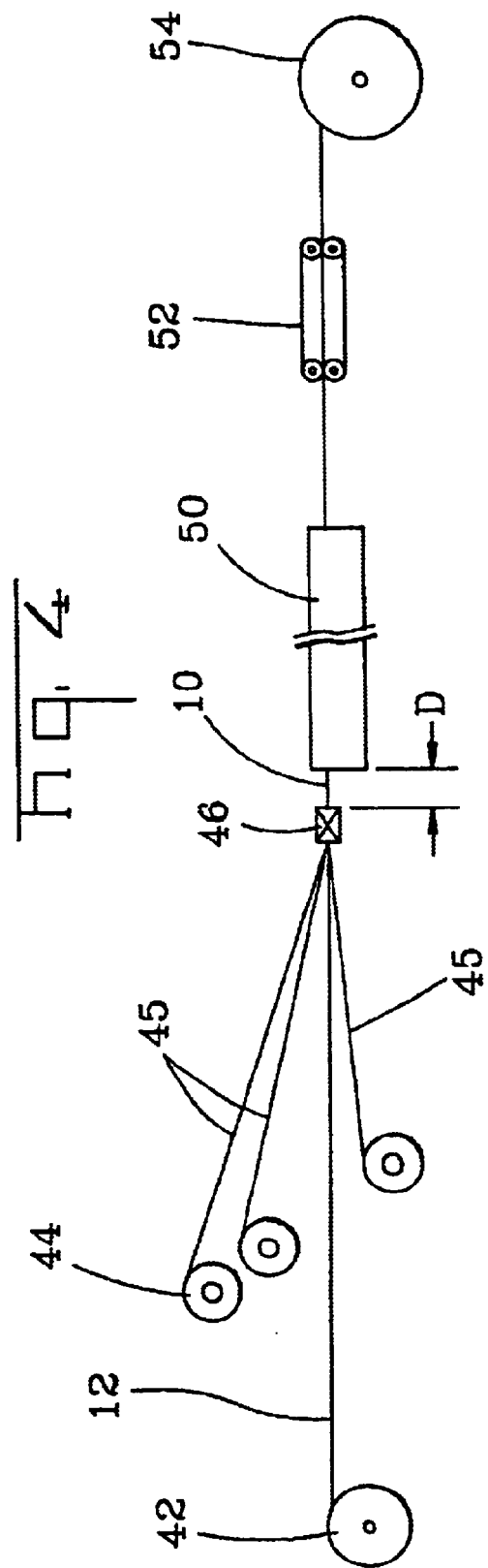

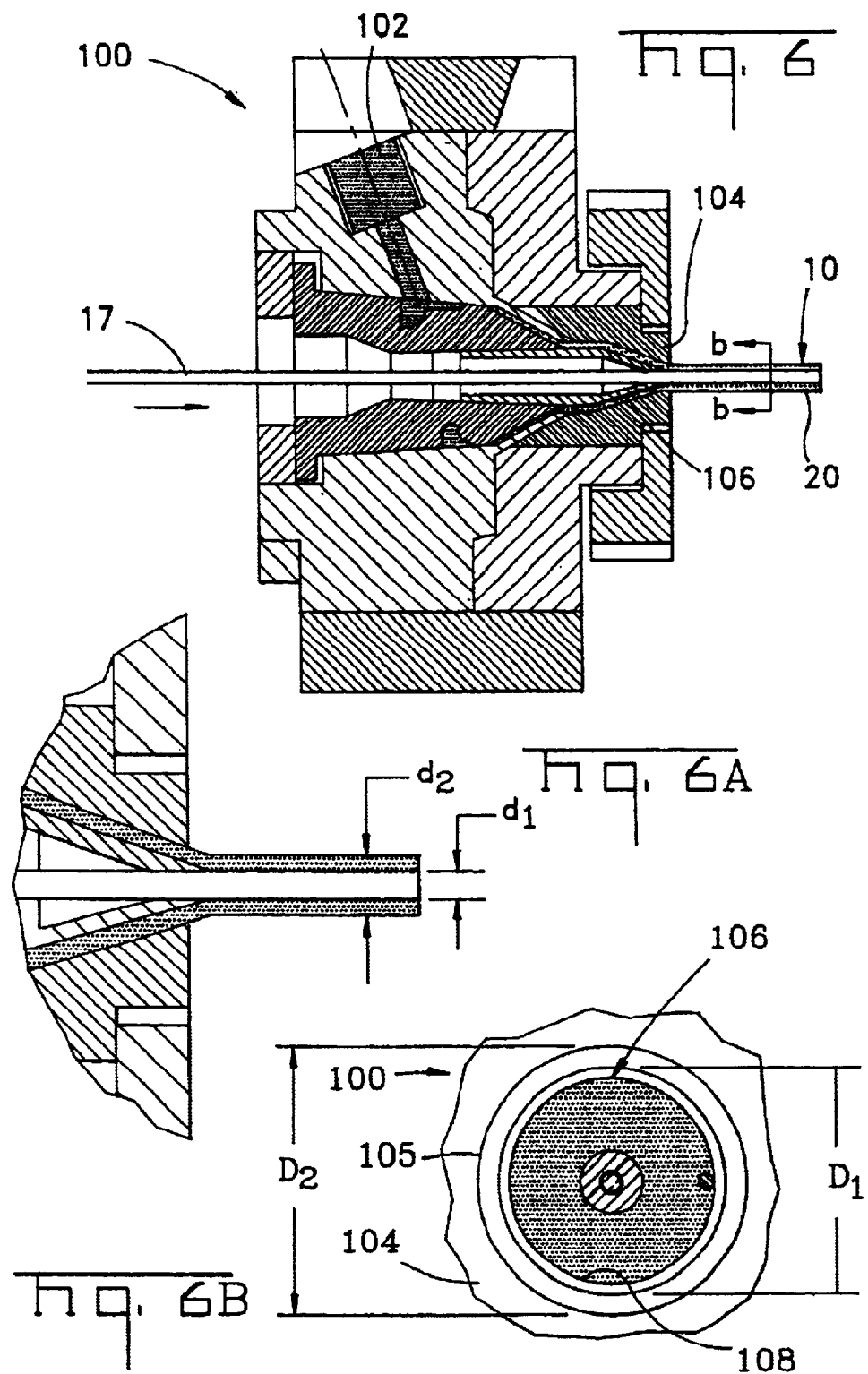

FIBER OPTIC CABLE HAVING A LOW-SHRINK CABLE JACKET AND METHODS OF MANUFACTURING THE SAME

RELATED APPLICATIONS

The present application is a Divisional of U.S. Ser. No. 10/038,073 filed on Jan. 4, 2002 now U.S. Pat. No. 6,801,695.

FIELD OF THE INVENTION

The present invention relates to fiber optic cables and, more particularly, to fiber optic cables having a cable jacket with a relatively low-shrink characteristic.

BACKGROUND OF THE INVENTION

Fiber optic cables include optical fibers that transmit signals, for example, voice, video, and/or data information. Optical fibers require cabling to protect the relatively fragile silica-based optical fibers and to preserve the optical performance thereof. For example, because optical fibers are not ductile they must be protected from external forces such as tensile forces. Additionally, optical fibers require protection from macro-bending and/or micro-bending to inhibit undesired optical degradation.

In order to meet these requirements, fiber optic cables designed for indoor, outdoor, or indoor/outdoor applications typically have a cable core surrounded by a sheath system that generally includes a cable jacket. For example, a cable core may include an optical fiber, a strength element, and/or a separation layer. The separation layer generally is on the outer surface of the cable core and prevents the extruded cable jacket from sticking to the cable core and/or optical fiber, thereby allowing relative movement between cable jacket and the cable core and/or optical fiber. The relative movement therebetween, for example, during bending and/or flexing of the fiber optic cable inhibits stress and/or strain on the optical fiber, thereby preserving optical performance. Additionally, the cable jacket protects the optical fibers from, for example, environmental effects.

The strength element of a fiber optic cable is intended to carry tensile loads applied to the fiber optic cable inhibiting, for example, tensile stress and/or strain from being applied to the optical fibers within the cable. Different types of strength members may be used in fiber optic cables, for example, metal wires, glass-reinforced plastics, and/or aramid fibers. Fiber optic cables may employ a single type of strength member or combinations of different types of strength members. However, different types of strength members may have different characteristics, for example, glass-reinforced plastic rods and/or metal wires additionally provide an anti-buckling characteristic to the fiber optic cable. However, strength members having anti-buckling characteristics generally increase the stiffness of the fiber optic cable, thereby increasing the bending radius of the fiber optic cable. Thus, fiber optic cables having strength members with anti-buckling characteristics are generally unsuitable for small bend radius applications, for example, splice trays and/or as an interconnect cable assembly.

Fiber optic cables having relatively flexible strength members, instead of stiff strength members, such as aramid fibers are generally more flexible and are suited for, among other applications, interconnect cable assemblies and/or within splice trays. Moreover, relatively flexible strength members may also, among other functions, provide a separation layer between the cable core and the cable jacket. However, fiber optic cables without anti-bucking members are generally susceptible to optical performance degradation due to shrinkage of the cable jacket during manufacture and/or due to ambient environmental changes in the field such as temperature and/or humidity.

For example, an interconnect cable assembly may include a fiber optic cable having a cable jacket extruded over a cable core with aramid fibers generally surrounding an optical fiber. The aramid fibers act as both a strength element and a separation layer. However, the aramid fibers do not provide anti-buckling. Consequently, the interconnect cable assembly is susceptible to optical performance degradation due to the shrinkage of the cable jacket because as the cable jacket shrinks the aramid fibers do not inhibit the optical fibers from becoming undulated and/or buckled.

The formation of the cable jacket of a fiber optic cable of the interconnect cable assembly is accomplished through an extrusion process where the jacketing material is melted at a relatively high temperature and extruded over the cable core that passes through, for example, a cross-head extruder. After the jacketing material is extruded over the cable core, the fiber optic cable passes through a water trough to quench the relatively hot cable jacket. When the jacketing material, for example, a polyvinyl chloride cools during the quenching process shrinkage of the cable jacket can occur. This shrinkage of the cable jacket can result in an undulated cable core causing undesirable compressive axial stress and/or strains being applied to the cable core and/or optical fiber, which can cause undesirable optical attenuation.

Additionally, there are other sources of cable jacket shrinkage that may cause undesired optical degradation. For example, in the field an interconnect cable assembly can also experience relatively large environmental temperature and/or humidity variations. Such variations can result in, for example, cable jacket expansion and contraction. The expansion and contraction of the cable jacket can cause tensile and compressive forces to be transferred to the optical fibers within the interconnect cable assembly. For example, shrinkage of the cable jacket can cause undulation and/or buckling of the optical fiber(s), thereby resulting in undesired optical degradation in the interconnect cable assembly.

The optical performance of a fiber optic cable can be measured, for example, by measuring an insertion loss through a fiber optic interconnect cable assembly. Insertion loss is a measure of a fraction of the signal light that is lost in the interconnect cable assembly and is, generally, measured in decibels. In general, insertion loss is an undesired result because it results in a weaker optical signal. Additionally, light can be lost if the end faces of the fibers are separated; therefore, the end faces of the fibers should also be maintained in virtual contact by the optical connectors. Fiber-to-fiber separation also implies an insertion loss due to Fresnel reflections at one of the two glass end interfaces.

There are different methods to reduce shrinking of the cable jacket to preserve optical performance. For example, one method to reduce shrinking of the cable jacket is to embed a strength element having an anti-buckling characteristic within the cable jacket. This may generally inhibit the cable jacket from shrinking during the manufacturing process when the cable jacket is cooling after being extruded. However, this results in a relatively stiff cable generally unsuitable for use in small bend radius applications and/or as an interconnect cable assembly.

Other methods to reduce the shrinkage of a cable jacket that do not require embedding strength elements within the cable jacket are known. For example, disclosed in U.S. Pat. No. 6,324,324, is a cable jacket that requires a resin containing a filler material with a high aspect ratio and possibly a coupling agent to aid adhesion between the filler material and the resin. The volumes of the filler material ranges between 1.5% and 25%. However, this method requires mixing the different materials, which may result in a non-homogeneous mixture. Additionally, mixing the materials of the cable jacket adds another level of complexity to the manufacturing process and can result in increased manufacturing costs.

SUMMARY OF THE INVENTION

The present invention is directed to a fiber optic cable including a fiber optic cable core having at least one optical fiber, and a cable jacket. The cable jacket generally surrounds the at least one optical fiber, wherein the cable jacket has an average shrinkage of about 2.0% or less.

The present invention is further directed to a fiber optic cable including a fiber optic cable core having at least one optical fiber and a separation layer that generally surrounds the at least one optical fiber. The fiber optic cable also includes a cable jacket generally surrounding the separation layer, wherein the cable jacket is formed from a material having an ultimate ASTM D-412 elongation in the range of about 350 percent to about 700 percent.

The present invention is also directed to a fiber optic cable including a fiber optic cable core having at least one optical fiber and a separation layer that generally surrounds the at least one optical fiber. The fiber optic cable also includes a cable jacket generally surrounding the separation layer, wherein the cable jacket is formed from a material having a flexural modulus, measured using ASTM D790, of about 10,000 psi or less.

The present invention is still further directed to a method of manufacturing a fiber optic cable including paying off at least one optical fiber and at least one separation element. Defining a cable core by placing the at least one separation element adjacent to the at least one optical fiber, and extruding a cable jacket around the cable core. The cable jacket being formed from a material having an ultimate elongation, measured using ASTM D-412, being in the range of about 350 percent to about 700 percent.

The present invention is yet further directed to a method of manufacturing a fiber optic cable including paying off at least one optical fiber and at least one separation element. Defining a cable core by placing the at least one separation element adjacent to the at least one optical fiber, and extruding a cable jacket around the cable core. The cable jacket being formed from a material having a flexural modulus, measured using ASTM D790, of about 10,000 psi or less.

The present invention is also directed to a fiber optic cable including a fiber optic cable core having at least one optical fiber and a separation layer that generally surrounds the at least one optical fiber, and a cable jacket that generally surrounds the separation layer. The fiber optic cable being a portion of an interconnect cable assembly having an average delta insertion loss of about 0.03 dB or less at a reference wavelength selected from the group of about 1310 nm, about 1550 nm, and 1625 nm during a thermal cycling test that cycles the temperature between a minimum of −40° C. and a maximum of 85° C.

BRIEF DESCRIPTION OF THE FIGS.

FIG. 1 is a cross-sectional view of an exemplary fiber optic cable according to the present invention.

FIG. 1a is a section of the fiber optic cable of FIG. 1.

FIG. 2 is an exemplary bar graph comparing the average shrinkage of a cable jacket of the fiber optic cable of FIG. 1 using exemplary cable jacket materials according to the present invention with an average shrinkage of the cable jacket of a fiber optic cable according to FIG. 1 having conventional jacket materials.

FIG. 3 is an exemplary bar graph comparing the average maximum delta insertion loss of the fiber optic cable of FIG. 1 using exemplary cable jacket materials according to the present invention with a fiber optic cable according to FIG. 1 having conventional jacket materials at various optical source wavelengths.

FIG. 3a is a schematic view of a portion of an exemplary fiber optic interconnect cable assembly according to the present invention.

FIG. 4 is a schematic view of an exemplary manufacturing line according to an embodiment of the present invention.

FIG. 6 is a schematic, cross-sectional, representation of an exemplary extrusion tool for manufacturing fiber optic cables according to the present invention.

FIG. 6a is an enlarged view of a section of the extrusion tool of FIG. 6.

FIG. 6b is an enlarged view of the exit face of the extrusion tooling taken at line b—b of FIG. 6.

FIG. 8 is a cross-sectional view of an exemplary fiber optic cable according to another embodiment of the present invention.

DETAILED DESCRIPTION OF THE INVENTION

Figure 7A:
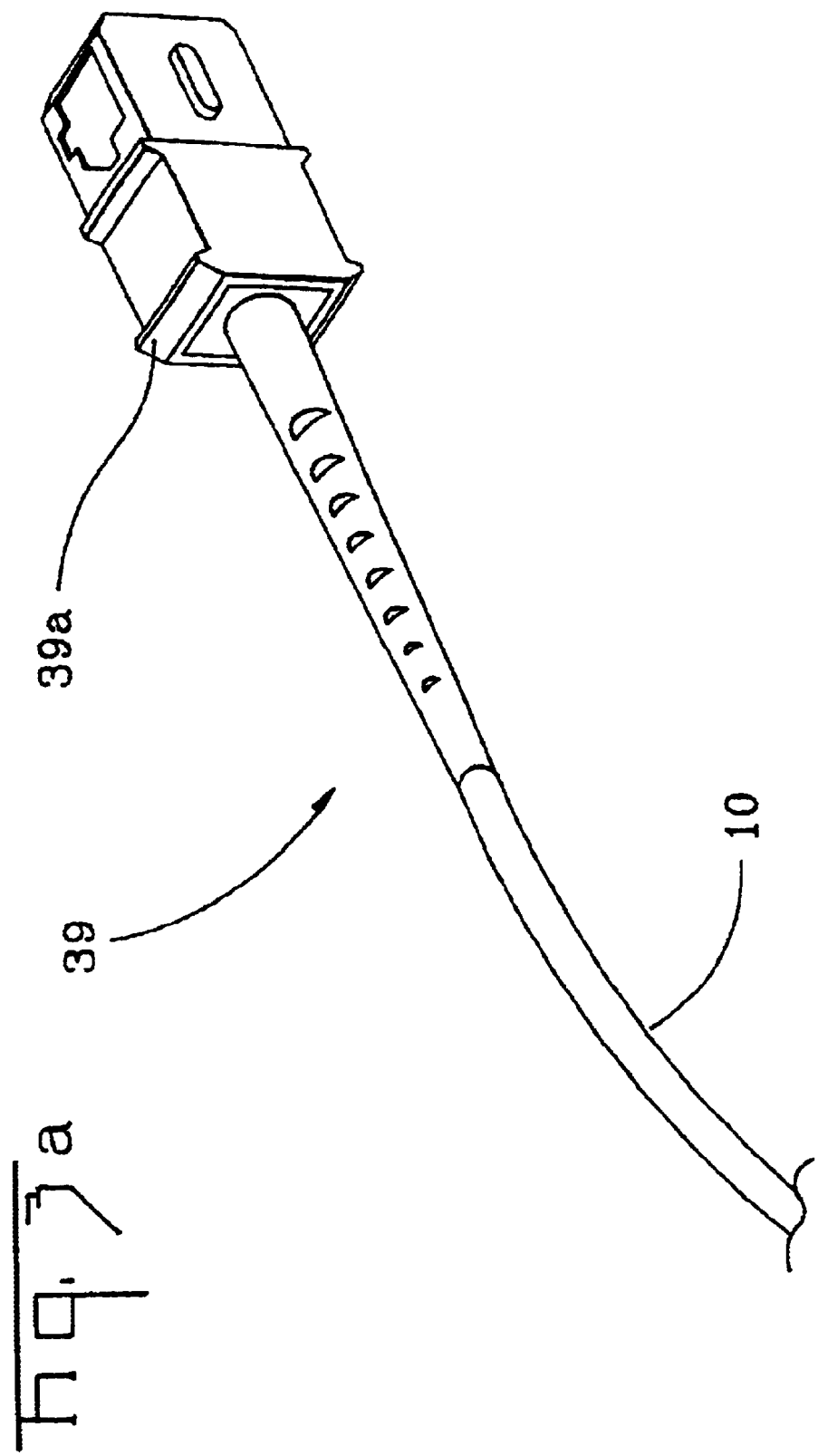
FIG. 7 is an exemplary graph depicting the average shrinkage of a cable jacket of the fiber optic cable of FIG. 1 having a cable jacket material according to the present invention as a function of other processing parameters.

Referring to FIG. 1, the present invention will be described with reference to an exemplary fiber optic cable 10. Fiber optic cable 10 generally includes a cable core 17 and a cable sheath 19 (FIG. 1a). Cable core 17 generally includes at least one optical fiber 12 having a tight buffer layer 14 therearound and an interfacial layer 15; however, cable core 17 may include other suitable cable components or fewer cable components. Sheath 19 generally includes a cable jacket 20; however, sheath 19 may include other suitable cable components. Interfacial layer 15 is generally disposed between optical fiber 12 and tight buffer layer 14 to promote stripability of tight buffer layer 14. A separation layer 16 generally surrounds tight buffer layer 14 and inhibits cable jacket 20 from adhering thereto, thereby preserving optical performance. Cable jacket 20 according to the present invention includes a low-shrink characteristic, thereby preserving optical performance, for example, in relatively high temperature and/or high humidity environments.

In one embodiment, optical fiber 12 includes at least one tight buffered optical fiber; however, other suitable configurations may be used. For example, optical fiber 12 may be loose and/or colored, contained in a buffer tube, bundled or ribbonized in a common matrix, disposed in a stack of ribbons, combinations thereof, or may include other suitable light waveguides. Each optical fiber 12 may include a silica-based core that is operative to transmit light and is surrounded by a silica-based cladding having a lower index of refraction than the core. Additionally, one or more coatings may be applied to optical fiber 12. For example, a soft primary coating surrounds the cladding, and a relatively rigid secondary coating surrounds the primary coating. Each optical fiber 12 can be, for example, a single-mode or multi-mode optical fiber available commercially from Corning Inc. of Corning, N.Y.

Interfacial layer 15 can be formed of a Teflon® containing material; however, other suitable interfacial layers may be used, for example, a UV acrylate. In other embodiments of the present invention, interfacial layer 15 may be omitted. Interfacial layer 15 serves as a release layer that provides a controlled bond between tight buffer layer 14 and optical fiber 12 so that a craftsman can easily strip tight buffer layer 14 from optical fiber 12, for example, during a termination procedure.

Tight buffer layer 14 is typically a polymeric material such as a polyvinyl chloride (PVC). However, tight buffer layer 14 can be formed from other suitable polymeric materials including polyethylenes (PEs), polypropylenes (PPs), polyvinylidene fluorides (PVDFs), ultraviolet (UV) curable materials, or other suitable polymers. Still further, tight buffer layer 14 may be formed of ethylene vinyl acetate (EVA), nylon, or polyester. Although not necessary for the practice of the present invention, tight buffer layer 14 can also be designed to be flame resistant as disclosed by U.S. Pat. No. 6,167,178, the subject matter of which is incorporated herein by reference. For example, tight buffer layer 14 can include aluminum trihydrate, antimony trioxide, or other suitable additives to improve the flame resistance of tight buffer layer 14.

Fiber optic cable 10 preferably includes a separation element and/or separation layer 16 for inhibiting adhesion between tight buffered optical fiber 12 and cable jacket 20. Separation layer 16 allows relative movement between optical fiber 12 and cable jacket 20 as fiber optic cable 10 is flexed or bent, thereby permitting optical signals to be transmitted via optical fiber 12 without disadvantageous optical attenuation. Separation layer 16 is preferably formed from a material having a melting point that is greater than the respective melting point(s) of cable jacket 20, and if used tight buffer layer 14, in order to inhibit adherence therebetween. Additionally, separation layer 16 can also act as a strength element to provide tensile strength to fiber optic cable 10. For example, as depicted in FIG. 1, separation layer 16 is an aramid yarn such as Kevlar® that may have a parallel direction of lay relative to optical fiber 12 or may be stranded therearound. However, other suitable yarns that provide tensile strength may be used for separation layer 16, for example, fiberglass yarns, Zylon®, Vectran®, Technora®, or Spectra®. However, in order to reduce the quantity of aramid yarns used for coverage, rather than strength, separation layer 16 can be formed of various other tapes, films, powders, threads and/or fibrous materials. For example, in one embodiment separation layer 16 can be formed from a plurality of Kevlar® yarns and a plurality of ultra-low shrink filaments as disclosed in U.S. patent application Ser. No. 09/873,671 filed on Jun. 4, 2001, the subject matter of which is incorporated herein by reference. In other embodiments, separation layer 16 may be formed from a water swellable tape in order to increase the water resistance of fiber optic cable 10. Additionally, separation layer 16 may be formed of a MYLAR® film having a thickness of, for example, about 1 mil, which may also serve as a binder for optical fibers 12. Additionally, fiber optic cable 10 may include fewer cable components or other suitable cable components, for example, a binder thread and/or a ripcord 13.

Cable jacket 20 according to the present invention has a relatively low-shrink characteristic. The present inventors investigated various methods and/or techniques to influence the shrink characteristic of cable jacket 20. The present inventors have discovered that, for example, material selection, material characteristics, and/or processing parameters can influence the shrink characteristic cable jacket 20 and thereby preserve optical performance. More specifically, the present inventors investigated numerous materials in combination with various processing parameters to determine their influence on the shrink characteristic of cable jacket 20. The present inventors have surprisingly discovered that cable jackets having low-shrink characteristics can substantially preserve, for example, the optical performance of a fiber optic interconnect cable assembly (FIG. 3a). Discussed herein are embodiments of the present invention that the present inventors believe give the best results; however, other suitable materials in combination with, or without, other processing parameters can be practiced with the concepts of the present invention to obtain suitable results. The materials of the present invention used for cable jacket 20 generally exclude resins requiring a filling material, having a high aspect ratio defined as a length to diameter ratio of 10 to 3500, and possibly a coupling agent to bond the filling material to the resin. However, embodiments of the present invention can include fillers not having a high aspect ratio and/or additives, for example, to improve flame retardance.

FIG. 2 is a graph depicting exemplary average shrinkage percentages for cable jacket 20 according to embodiments of the present invention and exemplary average shrinkage percentages for two conventional cable jacket materials as a baseline for comparison therewith. The experiments were conducted on a cable jacket 20 having a nominal outer diameter of about 2.9 mm and a nominal wall thickness of about 0.45 mm. However, the concepts of the present invention can be practiced with cable jackets 20 having other suitable nominal outer diameters and/or other suitable nominal wall thickness. Moreover, results may vary with the outer diameter and/or wall thickness of cable jacket 20. The embodiments according to the present invention were processed at a line speed of about 240 meters per minute and a water trough distance of about 29 inches; however, other suitable processing parameters may be used. Additionally, the effects of processing parameters will be discussed herein.

The present inventors conducted cable jacket shrinkage experiments on five samples of fiber optic cable 10 according to the present invention and calculated an exemplary average shrinkage percentage for each material. More specifically, the present inventors conducted a cable jacket shrinkage test. The cable jacket shrinkage test requires a sample of the fiber optic cable 150 mm long. Cable core 17 is removed from the fiber optic cable sample leaving cable jacket 20. Cable jacket 20 is placed in a thermal chamber at a temperature of 110±2° C. for two hours. At the end of the two hours, cable jacket 20 is removed from the thermal chamber and laid flat so the length of cable jacket 20 can be measured about 1 hour thereafter. The measured length of cable jacket 20 is then subtracted from the starting length of cable jacket 20 and the difference in length is divided by the starting length and multiplied by 100 to calculate a shrinkage percentage for that cable jacket 20. This cable jacket shrinkage test is generally performed on fiber optic cables having a relatively small outer diameter. The present inventors believe that removing cable core 17 from cable jacket 20 results in a cable jacket shrinkage that is generally higher than if cable core 17 remained within cable jacket 20. The present inventors believe that the cable jacket shrinkage test provides feedback on stress on the cable jacket and/or how a fiber optic cable interconnect assembly may perform under temperature and/or other environmental variations.

Additionally, an alternate cable jacket shrinkage test (hereinafter alternate shrinkage test) can be performed on fiber optic cables having relatively large diameters, for example, an inner diameter of cable jacket 20 of about 5 mm or greater; however, the alternate shrinkage test can be performed on cables having a smaller inner diameter of cable jacket 20. Moreover, for a suitable range of cable jacket 20 inner diameters either test may be performed and each test may give different results. The alternate shrinkage test requires a sample of the fiber optic cable jacket 150 mm long and 6 mm wide to be cut from a longitudinal axis of the fiber optic cable and placed in a thermal chamber at a temperature of 110±2° C. for two hours. At the end of the two hours, the sample is removed from the thermal chamber and laid flat so the length of the fiber optic cable sample can be measured about 1 hour thereafter. The measured length is then subtracted from the starting length and the difference in length is divided by the starting length and multiplied by 100 to calculate a shrinkage percentage for that sample.

Bar 22 (FIG. 2) depicts an exemplary average shrinkage during the cable jacket shrinkage test for a first conventional cable jacket formed from a polyvinyl chloride (PVC) material, sold under the tradename GW 2240 VW1 S available from the AlphaGary Corporation of Leominster, Mass., for use as a baseline comparison. As depicted in FIG. 2, the average shrinkage for this material was 2.4 percent. Bar 23 depicts an exemplary average shrinkage during the cable jacket shrinkage test for a second conventional cable jacket formed from a polyvinyl chloride (PVC) material, sold under the tradename Noraplas® 16881 available from the Georgia Gulf North American Plastics of Madison, Miss., for use as a baseline comparison. As depicted in FIG. 2, the average shrinkage for this material was 3.3 percent.

The present inventors believe that certain materials and/or material properties may possibly influence the shrinkage characteristic of cable jacket 20. For example, a partially cross-linked chlorinated polyolefin, can reduce the average shrinkage during a cable jacket shrinkage test compared with the average shrinkage during a cable jacket shrinkage test using conventional cable jacket materials. However, other suitable materials may be used to achieve similar results, for example, thermoplastic polyurethanes (TPUs). Moreover, materials having similar material properties and/or materials within the same material grade, family, and/or having similar blends may also provide reduced average shrinkage results.

More particularly, a flexural modulus measured using ASTM D790, an ultimate elongation measured using ASTM D-412, a Shore A hardness measured using ASTM D-2240, a melting onset temperature, and/or a cross-linking mechanism capable of inhibiting polymer reorientation are among the material properties that the present inventors believe may possibly inhibit shrinkage of cable jacket 20. Other suitable material properties may be influential, for example, Theological properties and/or a tensile modulus. Likewise, materials having a low crystallinity and/or amorphous structure may possibly inhibit shrinkage of cable jacket 20. However, the materials according to the present invention should meet all of the requirements for the fiber optic cable.

For example, the present inventors believe that the reduced average cable jacket shrinkage results and/or the preservation of optical performance according to the present invention can occur if the material of cable jacket 20 has a flexural modulus, measured using ASTM D790, of about 10,000 psi or less, more preferably about 8,500 psi or less, and most preferably about 7,500 psi or less. However, other suitable materials may have a flexural modulus in other suitable ranges.

The present inventors also believe that the reduced average cable jacket shrinkage results and/or preservation of optical performance according to the present invention can occur if the material of cable jacket 20 has an ultimate elongation, measured using ASTM D-412, in the range of about 350 percent to about 700 percent, and more preferably in the range of about 400 percent to about 650 percent. However, other suitable materials may have other suitable ranges of ultimate elongation.

Additionally, the present inventors believe that the reduced average shrinkage results and/or preservation of optical performance according to the present invention can occur if the material of cable jacket 20 has a Shore A hardness measured using ASTM D-2240 in the range of about less than 95, more preferably having a Shore A hardness of about less than 90, and most preferably a Shore A hardness of about less than 85. However, the present inventors believe that there is a lower limit of Shore A hardness where the material becomes too soft to operate effectively as a cable jacket.

Likewise, the present inventors believe that the reduced average shrinkage results and/or preservation of optical performance according to the present invention can occur if the melting onset temperature is generally above the temperature that the fiber optic cable will experience. Additionally, other cross-linking mechanisms capable of impeding polymer reorientation may also be useful. Melting onset temperature is defined as the lowest temperature at which melting becomes discernible. Melting onset temperature is used because most semi-crystalline polymers do not have a well-defined melting point. Melting onset temperature can be measured by a differential scanning calorimetry (DSC) method. For example, suitable materials according to the present invention may have a melting onset temperature, for example, about 110° C. or greater; however, other suitable melting onset temperatures that are lower may be used.

FIG. 2 also depicts the average shrinkage results during the cable jacket shrinkage test for three exemplary materials of the present invention. Bar 24 represents a partially cross-linked chlorinated polyolefin sold under the tradename Alcryn® ALR-7016 available from Advanced Polymer Alloys, a Division of Ferro Corporation, located in Wilmington, Del., and has a average shrinkage of about 1.3 percent. An Alcryn® 2080NC was blended with flame retardants to form Alcryn® ALR-7016. Alcryn® ALR-7016 has an ultimate elongation of about 400 percent measured using ASTM D-412, and a Shore A hardness of about 77 measured using ASTM D-2240. A flexural modulus for the Alcryn® ALR-7016 was not available from the manufacturer.

Bar 26 represents a thermoplastic polyurethane (TPU) sold under the tradename Elastollan® 1185A1OF available from BASF located in Wyandotte, Mich., and has an average shrinkage of about 0.8 percent. Elastollan® 1185A10F has a flexural modulus of about 7,000 psi measured using ASTM D790, an ultimate elongation of about 500 percent measured using ASTM D-412, and a Shore A hardness of about 87 measured using ASTM D-2240.

Bar 28 represents another thermoplastic polyurethane (TPU) sold under the tradename Estane® 58202 available from Noveon located in Cleveland, Ohio, and has an average shrinkage of about 0.9 percent. Estane® 58202 has a flexural modulus of about 6,110 psi measured using ASTM D790, an ultimate elongation of about 650 percent measured using ASTM D-412, and a Shore A hardness of about 85 measured using ASTM D-2240.

As depicted in FIG. 2, the three exemplary materials surprisingly reduced the average shrinkage of cable jacket 20 compared with the two conventional materials during the cable jacket shrinkage test. For example, the Elastollan® 1185A10F has about one-quarter of the cable jacket shrinkage compared with the conventional cable jacket materials. The Estane® 58202 has about one-third of the cable jacket shrinkage compared with the conventional cable jacket materials. Whereas the Alcryn® ALR-7016 has a slightly greater shrinkage percentage than the other two tested materials of the present invention. Of the three exemplary materials, the Alcryn® ALR-7016 and the 1185A10F are suitable for use with general-purpose cables (OFN), while the Estane® 58202 requires suitable additives to meet this rating. Moreover, certain exemplary materials of the present invention may have other suitable additives, for example, to meet the requirements of riser cables (OFNR) or other suitable fiber optic cable ratings.

The reduced average shrinkage of the exemplary materials according to the present invention generally inhibits the stress and/or strain that optical fiber 12 experiences during, for example, environmental variations such as relatively high temperatures and/or relatively high humidity. Consequently, the optical performance of optical fiber 12 and/or fiber optic cable 10 is preserved. The embodiments of the present invention, as depicted in FIG. 2, were tested by the present inventors for optical performance while varying environmental conditions (FIG. 3).

As shown, FIG. 3 depicts an average maximum delta insertion loss measured in dB, at three optical source wavelengths, for each of the three exemplary materials used in cable jacket 20 of the present invention during a temperature cycling test. Additionally, FIG. 3 depicts an average maximum delta insertion loss measured in dB, at different optical source wavelengths, for both of the conventional materials used in cable jacket 20 during a temperature cycling test for comparison with the materials of the present invention. The fiber optic cables using both the exemplary materials and the conventional materials included single mode optical fibers.

As used herein, delta insertion loss is generally a measurement of optical performance loss of a fiber optic interconnect cable assembly due to, for example, stresses and/or strains applied to the cable while separating out the inherent attenuation, insertion losses, and/or other losses, in the optical fibers, fiber optic connectors and/or splices, which are measured at ambient conditions. For example, an optical fiber generally has a certain attenuation loss due to characteristics inherent in the optical fiber, for example, reflectivity or imperfections in the fiber. Likewise, a fiber optic connector generally has a certain insertion loss due to, for example, misalignment of cores of the mating optical fibers. To determine delta insertion loss a baseline insertion loss from the optical fiber, fiber optic connectors and/or splices is measured at ambient conditions (i.e., room temperature) and subtracted from an insertion loss at a non-ambient condition. For example, the non-ambient condition may be a change in temperature that causes the fiber optic interconnect cable assembly to experience a decrease in optical performance. One such method is to cycle the temperature while measuring the optical performance of the fiber optic interconnect cable assembly.

As used herein, the temperature cycling test is defined by attaching suitable fiber optic connectors at both ends of a fiber optic cable that is 3.0±0.5 meters long to form a fiber optic interconnect cable assembly (hereinafter interconnect cable assembly). The entire length of the interconnect cable assembly is then placed within a thermal chamber including the fiber optic connectors. The fiber optic connectors of the interconnect cable assembly are mated, within the thermal chamber, with suitable optical connectors on leads of a suitable optical measurement testing rig. An optical signal is sent through the interconnect cable assembly, and a baseline insertion loss of the interconnect cable assembly is measured at an ambient condition, about 23° C. The temperature within the thermal chamber is then cycled between −40° C. and 85° C. More specifically, a period within the thermal chamber is defined as ramping the temperature from about 23° C. up to about 85° C. and holding this temperature plateau for about one hour, then ramping the temperature down to 23° C. and holding this temperature plateau for one hour. Next, the temperature within the thermal chamber was ramped down to −40° C. and held at this temperature plateau for 1 hour, then the temperature was ramped back to 23° C. and held at this temperature plateau for one hour. The ramp times between temperature plateaus were about one hour and the insertion loss was measured at each temperature plateau at least 30 minutes into each temperature plateau. This period was repeated 21 times. The maximum insertion loss throughout this temperature cycling test was measured for each interconnect cable assembly. The maximum insertion loss was subtracted from the baseline insertion loss and then divided by two to calculate the maximum delta insertion loss for a fiber optic connector pair. The difference between maximum insertion loss and baseline insertion loss was divided by two because both of the fiber optic connectors of the interconnect cable assembly were located within the thermal chamber during the temperature cycling test. This temperature cycling test was done for five samples of each of the materials of the present invention, except for the Estane® 58202 which had three samples, and an average maximum delta insertion loss was calculated and is presented in FIG. 3.

Bars 32 and 33 illustrate an average maximum delta insertion loss of the interconnect cable assembly that includes fiber optic cable 10 having cable jacket 20 formed from the GW 2240 VW1 S and Noraplas® 16881 conventional materials, respectively, at an optical source wavelength of 1310 nm. As shown, at 1310 nm the GW 2240 VW1 S conventional material has an average maximum delta insertion loss of 0.037 dB and the Noraplas® 16881 conventional material has an average maximum delta insertion loss of 0.058 dB. Bars 32*a* and 33*a* illustrate average maximum delta insertion losses for the interconnect cable assembly that includes fiber optic cable 10 having cable jacket 20 formed from the GW 2240 VW1 S and Noraplas® 16881 conventional materials, respectively, at an optical source wavelength of 1550 nm. As shown, at 1550 nm the GW 2240 VW1 S conventional material has an average maximum delta insertion loss of 0.044 dB and the Noraplas® 16881 conventional material has an average maximum delta insertion loss of 0.087 dB. Bar 32*b* illustrates an average maximum delta insertion loss for the interconnect cable assembly that includes fiber optic cable 10 having cable jacket 20 formed from the GW 2240 VW1 S conventional material at an optical source wavelength of 1625 nm. As shown, at 1625 nm the GW 2240 VW1 S conventional material has an average delta insertion loss of 0.047 dB.

The temperature cycling test for the conventional materials were conducted in a manner similar to the present invention, except for the following differences in the testing of the Noraplas® 16881 conventional material. First, the maximum temperature during the temperature cycling test was only ramped up to 75° C., instead of 85° C. Second, only one mated fiber optic connector pair and a portion of the interconnect cable assembly was contained within the thermal chamber. Consequently, the difference between the maximum measured insertion loss and the baseline insertion loss was not divided by two to obtain a maximum delta insertion loss since only one mated fiber optic connector pair was within the thermal chamber. Third, the average maximum delta insertion loss testing was only conducted at optical source wavelengths of 1310 nm and 1550 nm.

Bars 34, 36, and 38 of FIG. 3 illustrate exemplary average maximum delta insertion losses of the interconnect cable assembly that includes fiber optic cable 10 having cable jacket 20 formed from the exemplary materials according to the present invention, namely, Alcryn® ALR-7016, Elastollan® 1185A10F, and Estane® 58202, respectively, at an optical source wavelengths of 1310 nm. As shown, at 1310 nm the Alcryn® ALR-7016 material has an average maximum delta insertion loss of 0.021 dB, the Elastollan® 1185A10F material has an average maximum delta insertion loss of 0.015 dB, and the Estane® 58202 material has an average maximum delta insertion loss of 0.023 dB.

Bars 34a, 36a, and 38a of FIG. 3 illustrate exemplary average maximum delta insertion losses of the interconnect cable assembly that includes fiber optic cable 10 having cable jacket 20 formed from the exemplary materials according to the present invention, namely, Alcryn® ALR-7016, Elastollan® 1185A10F, and Estane® 58202, respectively, at an optical source wavelengths of 1550 nm. As shown, at 1550 nm the Alcryn® ALR-7016 material has an average maximum delta insertion loss of 0.021 dB, the Elastollan® 1185A10F material has an average maximum delta insertion loss of 0.023 dB, and the Estane® 58202 material has an average maximum delta insertion loss of 0.027 dB.

Bars 34b, 36b, and 38b of FIG. 3 illustrate exemplary average maximum delta insertion losses of the interconnect cable assembly that includes fiber optic cable 10 having cable jacket 20 formed from the exemplary materials according to the present invention, namely, Alcryn® ALR-7016, Elastollan® 1185A10F, and Estane® 58202, respectively, at an optical source wavelengths of 1625 nm. As shown, at 1625 nm the Alcryn® ALR-7016 material has an average maximum delta insertion loss of 0.020 dB, the Elastollan® 1185A10F material has an average maximum delta insertion loss of 0.021 dB, and the Estane® 58202 material has an average maximum delta insertion loss of 0.035 dB.

The exemplary materials of the present invention surprisingly reduced the average maximum delta insertion loss compared with the two conventional materials during the temperature cycling test. For example, at a wavelength of 1310 nm the Elastollan® 1185A10F has about a seventy-five percent reduction in average maximum delta insertion loss compared with the Noraplas® 16881 conventional cable jacket material, and about a sixty percent reduction in average maximum delta insertion loss compared with the GW 2240 VW1 S conventional cable jacket material. At 1310 nm, the Estane® 58202 has about a sixty percent reduction in average maximum delta insertion loss compared with the Noraplas® 16881 conventional cable jacket material, and about a forty percent reduction in average maximum delta insertion loss compared with the GW 2240 VW1 S conventional cable jacket material. Whereas at 1310 nm, the Alcryn® ALR-7016 has about a sixty-five percent reduction in average maximum delta insertion loss compared with the Noraplas® 16881 conventional cable jacket material, and about an forty-five percent reduction in average maximum delta insertion loss compared with the GW 2240 VW1 S conventional cable jacket material.

A number of processing parameters can also influence the shrinkage characteristics of cable jacket 20 according to the present invention. The present inventors believe the most influential processing parameters, for example, are manufacturing line-speed, water trough distance, and/or draw down ratio. Additionally, the present inventors also believe that processing parameters such as an extruder temperature profile may influence shrink characteristics; however, other processing parameters may also influence shrink characteristics.

An exemplary method for manufacturing fiber optic cable 10 according to the present invention is schematically depicted in FIG. 4. A tight-buffered optical fiber 12 is paid-off from pay-off reel 42 under a suitable tension. Three reels 44 each pay-off a fiber 45 such as an aramid fiber under a suitable tension that acts as a portion of separation layer 16 and a strength element as described herein. Fibers 45 can have a longitudinal lay or a helical lay around tight-buffered optical fiber 41. To produce a longitudinal lay, fibers 45 and tight-buffered optical fiber 41 are collected by a non-rotating lay plate at the rear entrance of a cross-head extruder 46. More particularly, tight-buffered optical fiber 41 passes through a central opening in the lay plate and the three fibers 45 pass through openings generally equally spaced, at about 120 degree intervals, around the central opening to form a cable core. Cable jacket 20 is then applied by cross-head extruder 46 to generally surround the cable core to complete fiber optic cable 10.

Water trough 50 cools the relatively hot cable jacket 20 after extrusion. A water trough distance D is defined as the distance between the exit of the cross-head extruder 46 and the entrance of water trough 50. Water trough distance D is a processing parameter according to the present invention that can be varied to influence the low-shrink characteristic of cable jacket 20. After exiting water trough 50, fiber optic cable 10 then passes through a pulling device 52 and is wound onto take-up reel 54. The cable jackets 20 were made according to the present invention with the water in trough 50 at ambient temperature; however, other suitable water temperatures and/or zones of water temperatures may be used.

Figure 5:
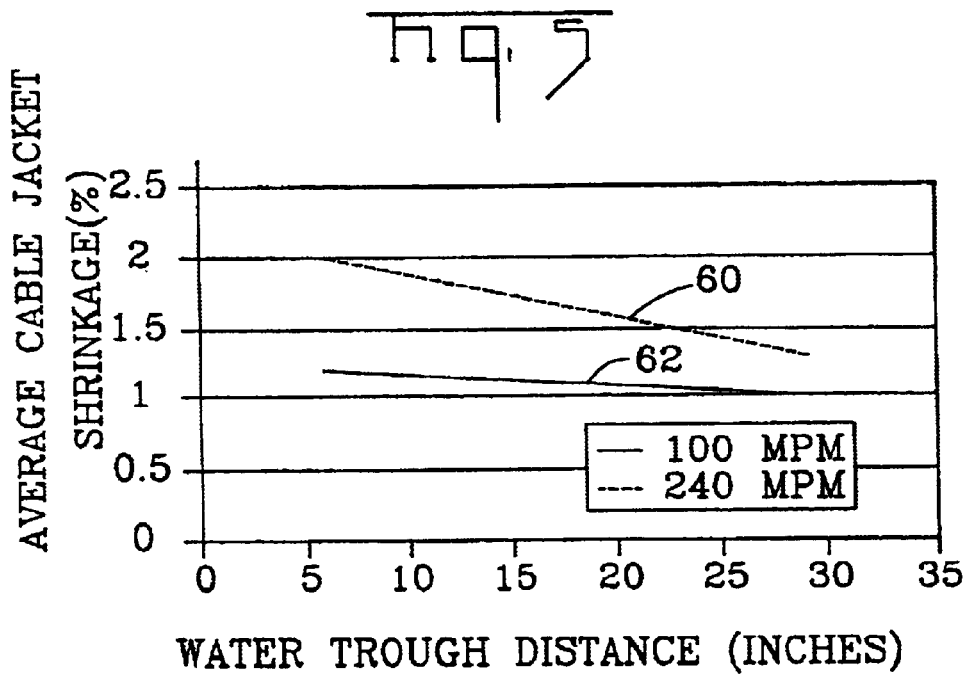
FIG. 5 is an exemplary graph depicting the average shrinkage of a cable jacket of the fiber optic cable of FIG. 1 having a cable jacket material according to the present invention as a function of processing parameters.

FIG. 5 is an exemplary graph depicting the average shrinkage, as a function of processing parameters, of an exemplary cable jacket 20 during the cable jacket shrinkage test using a material according to the present invention. More specifically, FIG. 5 depicts the average shrinkage of cable jacket 20 made from Alcryn® ALR-7016 having a nominal outer diameter of about 2.9 mm and a nominal wall thickness of about 0.45 mm as a function of linespeed and water trough distance D. Linespeed is defined as the length of fiber optic cable wound onto take-up reel 54 per minute, and is generally expressed as meters per minute.

Lines 60 and 62 represent two different linespeeds as the water trough distance D is varied from about 6 inches to about 29 inches. More specifically, line 60 represents the average cable jacket shrinkage for a linespeed of about 240 meters per minute, and line 62 represents the average cable jacket shrinkage for a linespeed of about 100 meters per minute. The present inventors believe, all things being equal, that as the linespeed generally increases the average cable jacket shrinkage generally increases. However, the present inventors also believe that the water trough distance D can also influence the average cable jacket shrinkage, and more particularly, that as linespeed increases water trough distance D can have a greater influence as evidenced by the different slopes of lines 60 and 62.

FIGS. 6–6*b* depict a schematic representation of an exemplary extrusion tooling 100 of cross-head extruder 46. By way of example, extrusion tooling 100 is operative to extrude cable jacket materials of the present invention about cable core 17 of cable 10. As cable core 17 is fed into extrusion tooling 100 (FIG. 6), a cable jacketing material according to the present invention is supplied under suitable temperature and pressure conditions to an inlet port 102. The cable jacketing material is channeled toward a die 104 and a tip 106. The cable jacketing material generally surrounds cable core 17 thereby forming cable jacket 20 therearound to complete cable 10.

FIG. 6*b* schematically illustrates an exit face of extrusion tooling 100 with the cable jacketing material or melt removed for illustrative purposes. In one embodiment of the present invention, tip 106 includes an orifice 108 defined within the end portion of tip 106 for receiving cable core 17. More particularly, tip 106 can include a round shape that generally complements cable core 17; however, other suitable shapes can be employed. Tip 106 includes an inner diameter generally greater than the respective diameter of cable core 17 and an outer diameter $D_1$. Die 104 includes a die orifice 105 having a diameter $D_2$. Diameters $D_1$ and $D_2$ are generally greater than the respective finished inner and outer diameters $d_1$ and $d_2$ (FIG. 6*a*) of cable jacket 20. This tube-on extrusion results in cable jacket 20 having a generally round cross-section, as exemplified by the embodiment of FIG. 1. In the tube-on process, the end of tip 106 is generally flush with the face of die 104.

Additionally, embodiments of the present invention may use a pressure extrusion process or a tube-on plus vacuum draw-down process. In a pressure extrusion process, the end of tip 106 is generally recessed from the face of die 104. Whereas in the tubing-on plus vacuum draw down-down process, the end of tip 106 is generally flush with the face of die 104. In general, the die orifice 105 used for the pressure extrusion process is relatively smaller than the die orifice 105 used for the tubing-on plus vacuum draw-down process.

Figure 7:
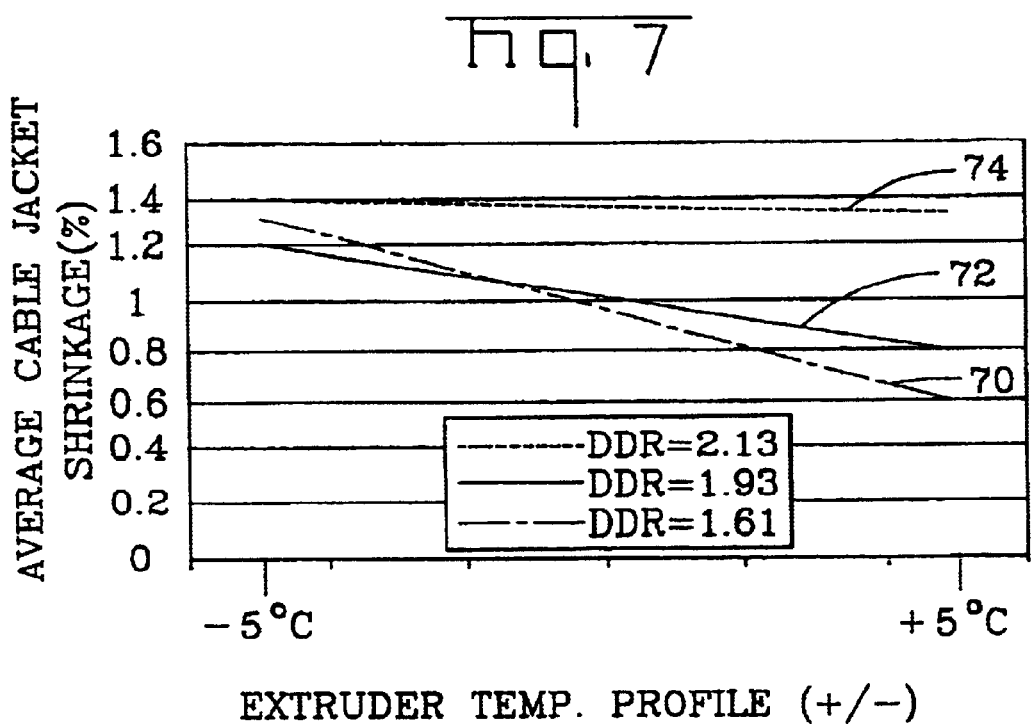

FIG. 7 is an exemplary graph depicting the average shrinkage, as a function of other processing parameters, of an exemplary cable jacket 20 during the cable jacket shrinkage test using a material according to the present invention. More specifically, FIG. 7 depicts the average shrinkage of cable jacket 20 made from Alcryn® ALR-7016, which has a nominal outer diameter of about 2.9 mm, as a function of extruder temperature profile and draw-down ratio (DDR). Draw-down ratio is defined by the following equation:

$$DDR = \frac{D_2^2 - D_1^2}{d_2^2 - d_1^2}$$

Where:
 $D_2$-Die orifice diameter
 $D_1$-Outer diameter of tip
 $d_2$-Outer diameter of cable jacket
 $d_1$-Inner diameter of cable jacket Lines 70, 72 and 74 represent three different draw-down ratios as the extruder temperature profile is varied from a baseline extrusion temperature, which is about 165° C. at zone 1 of an extruder barrel and an extrusion die temperature of about 185° C., by about –5° C. to about +5° C. More specifically, the –5° C. variation represents a temperature of about 160° C. at zone 1 of the extruder barrel and an extrusion die temperature of about 180° C. The +5° C. variation represents a temperature of about 170° C. at zone 1 of the extruder barrel and an extrusion die temperature of about 190° C. All three lines 70, 72 and 74 were run at a linespeed of 240 mpm and a water trough distance D of about 24 inches and generally decrease and/or remain relatively flat as the extruder temperature profile is increased. As shown, line 70 has the steepest relative slope and the lowest average cable jacket shrinkage. Line 70 represents a DDR of about 1.61 with a nominal wall thickness of cable jacket 20 of about 0.5 mm. Line 72 represents a DDR of about 1.93 with a nomimal wall thickness of cable jacket 20 of about 0.45 mm. The average cable jacket shrinkage of line 72 generally decreases as the extruder temperature profile increases. Line 74 represents a DDR of about 2.13 with a nominal wall thickness of cable jacket 20 of about 0.40 mm. However, the average cable jacket shrinkage of line 74 remains relatively flat as the extruder temperature profile is increased.

DDR and/or nominal cable jacket wall thickness can be influenced, for example, by moving die 104 relative to tip 106. For example, DDR can be generally decreased by moving die 104 away from tip 106; however, the extruder screw speed generally requires an increase in rpm to maintain the same nominal outer diameter of cable jacket 20 because a larger volume of material is-required. Likewise, DDR can be generally increased by moving die 104 towards tip 106 and the extruder screw speed can be adjusted to provide a suitable volume of material.

The present inventors believe that the slower linespeed, larger water trough distance and/or lower DDR are advantageous because these parameters allow the extruded material to achieve a lower-stress state before being quenched. In other words, these parameters affect the stress the extruded material experiences before being cooled in the water trough. Additionally, other suitable values of linespeed, water trough distance, water trough temperature and/or DDR may also be advantageous. However, the processing parameters were all tested on the Alcryn 7016 material and other suitable materials may be affected differently by the processing parameters.

Furthermore, the concepts of the present invention may advantageously improve optical performance in other environmental conditions and/or tests other than the temperature cycling test. For example, the concepts of the present invention may improve optical performance during thermal aging, humidity aging, humidity-condensation cycling, and/or other suitable environmental conditions.

Additionally, the concepts of the present invention may be advantageously practiced with other suitable fiber optic cables. For example, FIG. 8 illustrates a fiber optic cable 10' that has a cable core and a cable sheath. Fiber optic cable 10' may have a construction as disclosed in U.S. patent application Ser. No. 09/107,676 filed on Jun. 30, 1998, the content of which is incorporated herein by reference. However, other suitable fiber optic ribbon cable constructions may be used with the concepts of the present invention. The cable core includes at least one optical fiber 12 disposed in a matrix forming a fiber optic ribbon 11' and separation element and/or separation layer 16' formed from, for example, aramid fibers. Cable sheath includes a cable jacket 20 according to the present invention. In another embodiment, fiber optic ribbon 11' can be configured as disclosed in U.S. patent application Ser. No. 09/943,996 filed on Aug. 31, 2001, the contents of which are incorporated herein by reference. Likewise, fiber optic cable 10' can include suitable connectors to form an interconnect cable assemblies that can have improve optical performance.

Moreover, the concepts of the present inventions can be practiced with fiber optic cables having other suitable cable cores and/or cable sheaths. For example, the concepts of the present inventions can be practiced with cable sheaths having a strength member disposed in a cable jacket, for example, aramid fibers and/or metal wires. Likewise, a cable sheath-and/or cable core may include a water swellable material or other suitable components. The concepts of the present invention may also be practiced with cables including electrical conductors and optical fibers.

Furthermore, the concepts of the present invention may also be practiced with other suitable materials. For example, some material that may be suitable are thermoplastic polyurethanes (TPUs) such as Estane® 58211 or X-4928 both available from Noveon, thermoplastic elastomers (TPEs) such as GFO 9940DW available from AlphaGary, a thermoplastic vulcanizates (TPVs) such as Uniprene® 7100-80 FR available from Teknor Apex of Pawtucket, R.I., or polyvinylidene fluorides (PVDFs).

In view of the present disclosure, many modifications and other embodiments of the present inventions, within the scope of the appended claims, will become apparent to a skilled artisan. For example, cable jackets of the present invention may be manufactured from other suitable materials and may be used as inner cable jackets and/or outer cable jackets. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been described with reference to an indoor fiber optic cable, but the inventive concepts of the present invention are applicable to other fiber optic cables as well.

That which is claimed:

1. A method of manufacturing a fiber optic cable comprising:
   paying off at least one optical fiber and at least one separation element;
   defining a cable core by placing said at least one separation element adjacent to said at least one optical fiber; and
   extruding a cable jacket around said cable core, wherein said cable jacket is formed from a material having an ultimate elongation, measured using ASTM D-412, being in the range of about 350 percent to about 700 percent said cable jacket having an average shrinkage of about 2.0% or less measured about 1 hour after a cable jacket shrinkage test conducted at a temperature of 110° C. for 2 hours with the cable core removed.

2. The method of claim 1, said cable jacket having an average shrinkage of about 1.5% or less measured about 1 hour after a cable jacket shrinkage test conducted at a temperature of 110° C. for 2 hours with the cable core removed.

3. The method of claim 1, said fiber optic cable being a portion of an interconect cable assembly having at least one optical connector, said interconnect cable assembly having an average delta insertion loss of about 0.03 dB or less at a reference wavelength selected from the group of about 1310 nm, about 1550 nm and 1625 nm during a thermal cycling test that cycles the temperature between a minimum of −40° C. and a maximum of 85° C.

4. The method of claim 1, the step of extruding said cable jacket being accomplished by a tube-on process.

5. The method of claim 1, said step of extruding having a draw-down ratio (DDR) of about 2 or less.

6. The method of claim 1, the step of extruding said cable jacket further comprising a flexural modulus of said material, measured using ASTM D790, of about 10,000 psi or less.

7. The method of claim 1, the step of extruding said cable jacket further comprising a flexural modulus of said material, measured using ASTM D790, of about 8,500 psi or less.

8. The method of claim 1, the step of extruding said cable jacket further comprising a flexural modulus of said material, measured using ASTM D790, of about 7,500 psi or less.

9. The method of claim 1, the step of extruding a cable jacket further comprising a Shore A hardness of said material, measured using ASTM D-2240, of about 95 or less.

10. The method of claim 1, the step of extruding said cable jacket further comprising a Shore A hardness of said material, measured using ASTM D-2240, of about 90 or less.

11. The method of claim 1, the step of extruding said cable jacket further comprising a Shore A hardness of said material, measured using ASTM D-2240, of about 85 or less.

12. The method of claim 1, the step of extruding said cable jacket further comprising said material being selected from the group of a polyether type thermoplastic polyurethane, a partially cross-linked chlorinated polyolefin, a thermoplastic polyurethane (TPU), a thermoplastic elastomer (TPE), a thermoplastic vulcanizates (TPVs), and polyvinylidene fluorides (PVDFs).

13. The method of claim 1, said step of extruding said cable jacket further comprising said material having a melting onset temperature being about 110° C. or greater.

14. A method of manufacturing a fiber optic cable comprising:
   paying off at least one optical fiber and at least one separation element;
   defining a cable core by placing said at least one separation element adjacent to said at least one optical fiber; and
   extruding a cable jacket around said cable core, wherein said cable jacket is formed from a material having a flexural modulus, measured using ASTM D790, of about 10,000 psi or less said cable jacket having an average shrinkage of about 2.0% or less measured about 1 hour after a cable jacket shrinkage test conducted at a temperature of 110° C. for 2 hours with the cable core removed.

15. The method of claim 14, said cable jacket having an average shrinkage of about 1.5% or less during a cable jacket shrinkage test conducted at a temperature of 110° C. for 2 hours with the cable core removed.

16. The method of claim 14, said fiber optic cable being a portion of an interconnect cable assembly having at least one optical connector, said interconnect cable assembly having an average delta insertion loss of about 0.03 dB or less at a reference wavelength selected from the group of about 1310 nm, about 1550 nm, and 1625 nm during a thermal cycling test that cycles the temperature between a minimum of −40° C. and a maximum of 85° C.

17. The method of claim 14, the step of extruding said cable jacket being accomplished by a tube-on process.

18. The method of claim 14, said step of extruding said cable jacket having a draw-down ratio (DDR) of about 2 or less.

19. The method of claim 14, the step of extruding said cable jacket further comprising an ultimate elongation of said material, measured using ASTM D-412, being in the range of about 350 percent to about 700 percent.

20. The method of claim 14, the step of extruding said cable jacket further comprising a Shore A hardness of said material, measured using ASTM D-2240, of about 95 or less.

21. The method of claim 14, the step of extruding said cable jacket further comprising said material being selected from the group of a polyether type thermoplastic polyurethane, a partially cross-linked chlorinated polyolefin, a thermoplastic polyurethane (TPU), a thermoplastic elastomer (TPE), a thermoplastic vulcanizates (TPVs), and polyvinylidene fluorides (PVDFS).

22. The method of claim 14, said step of extruding said cable jacket further comprising said material having a melting onset temperature being about 110° C. or greater.

* * * * *